Dec. 2, 1941. O. STEINER 2,264,777
PHOTOGRAPHIC CAMERA STRUCTURE
Filed Dec. 15, 1939 5 Sheets-Sheet 1

INVENTOR.
Oscar Steiner,
BY
ATTORNEYS.

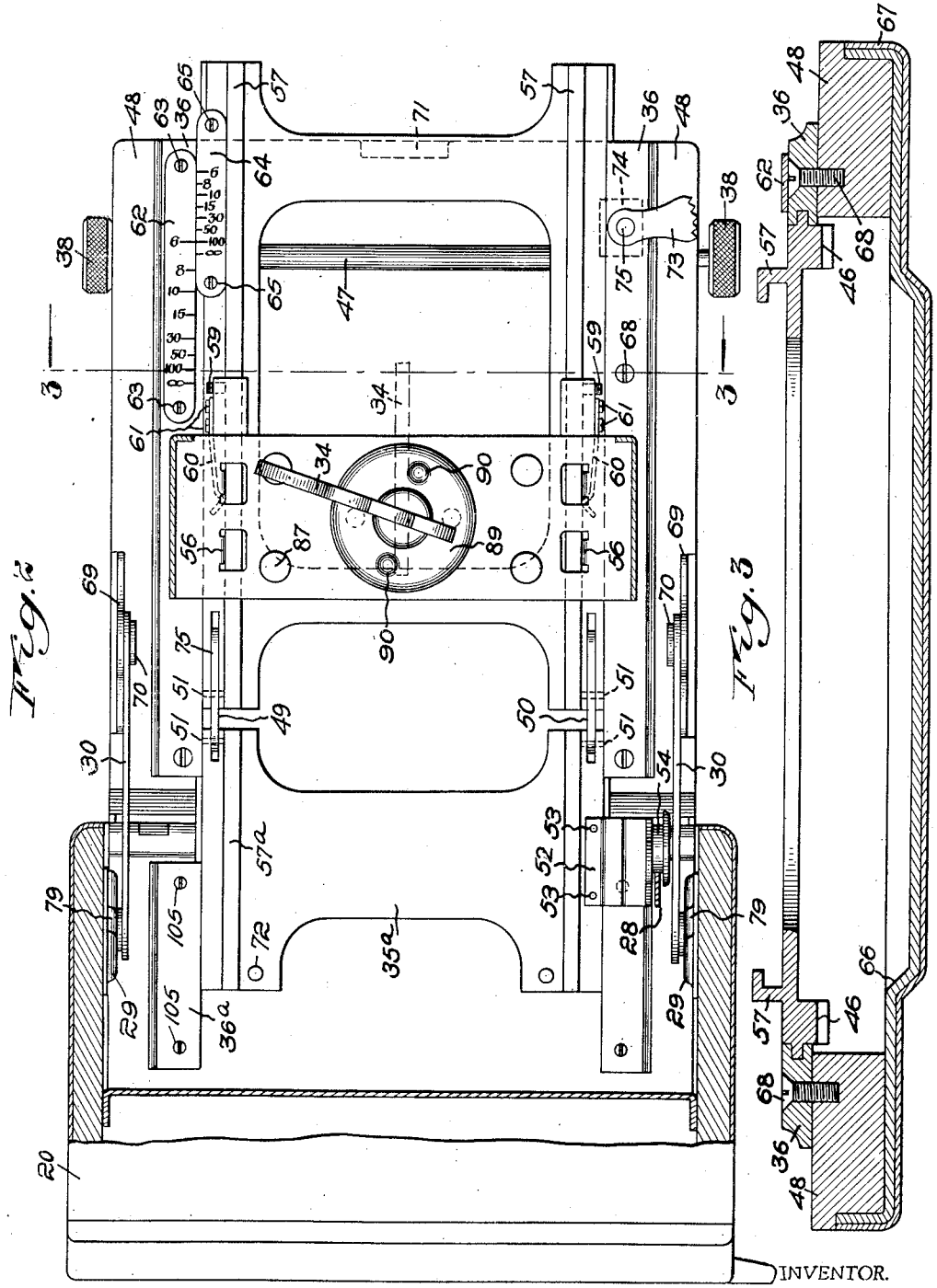

Dec. 2, 1941.　　　　O. STEINER　　　　2,264,777
PHOTOGRAPHIC CAMERA STRUCTURE
Filed Dec. 15, 1939　　　5 Sheets-Sheet 3
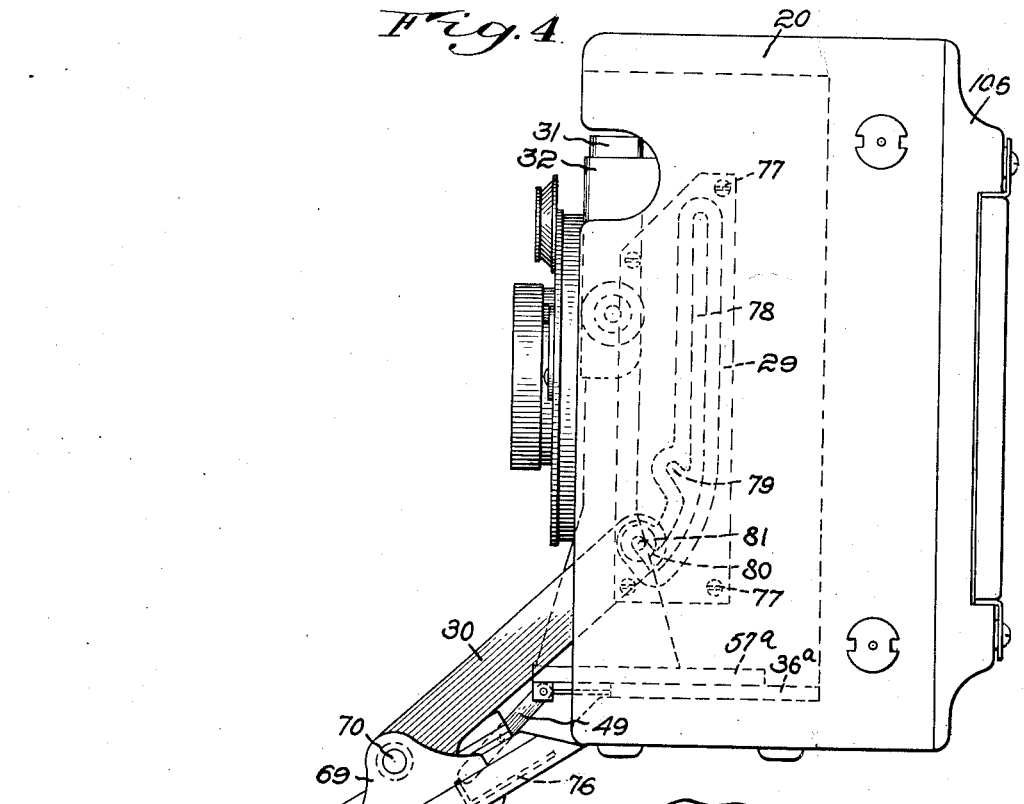
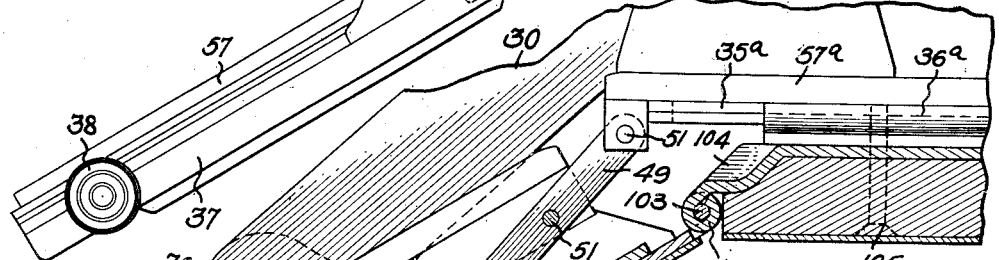
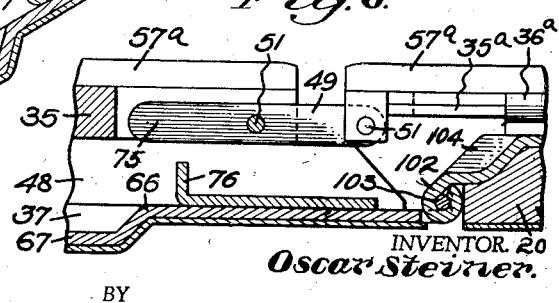
INVENTOR.
Oscar Steiner.
BY Emery Booth Townsend Miller Weidner
ATTORNEYS.

Dec. 2, 1941.                    O. STEINER                    2,264,777
                        PHOTOGRAPHIC CAMERA STRUCTURE
                         Filed Dec. 15, 1939         5 Sheets-Sheet 4
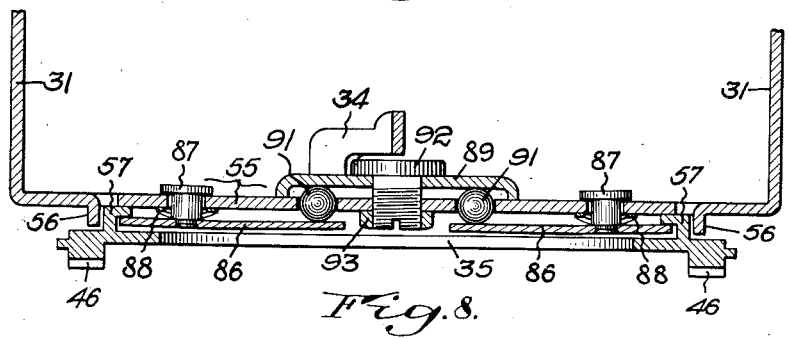
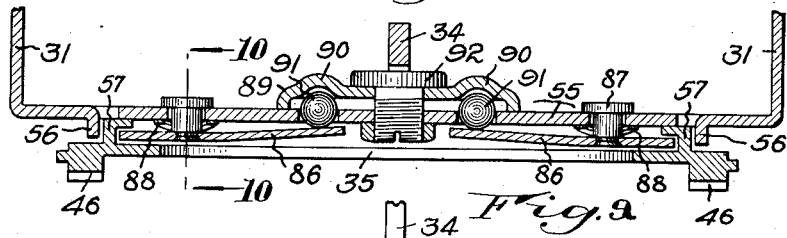
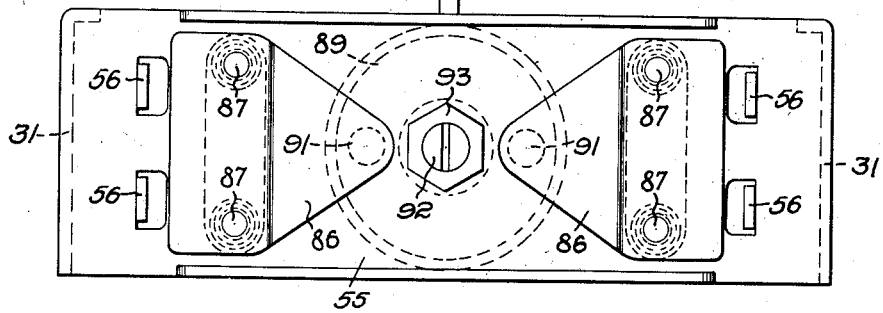
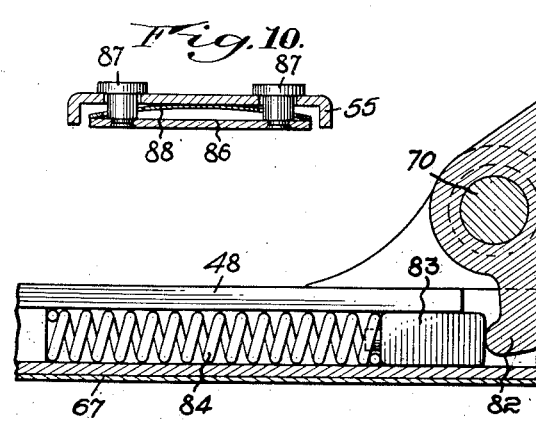
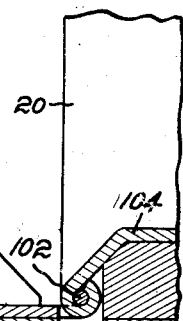
INVENTOR.
Oscar Steiner,
BY
Emery Booth Townsend Miller Weidner
ATTORNEYS

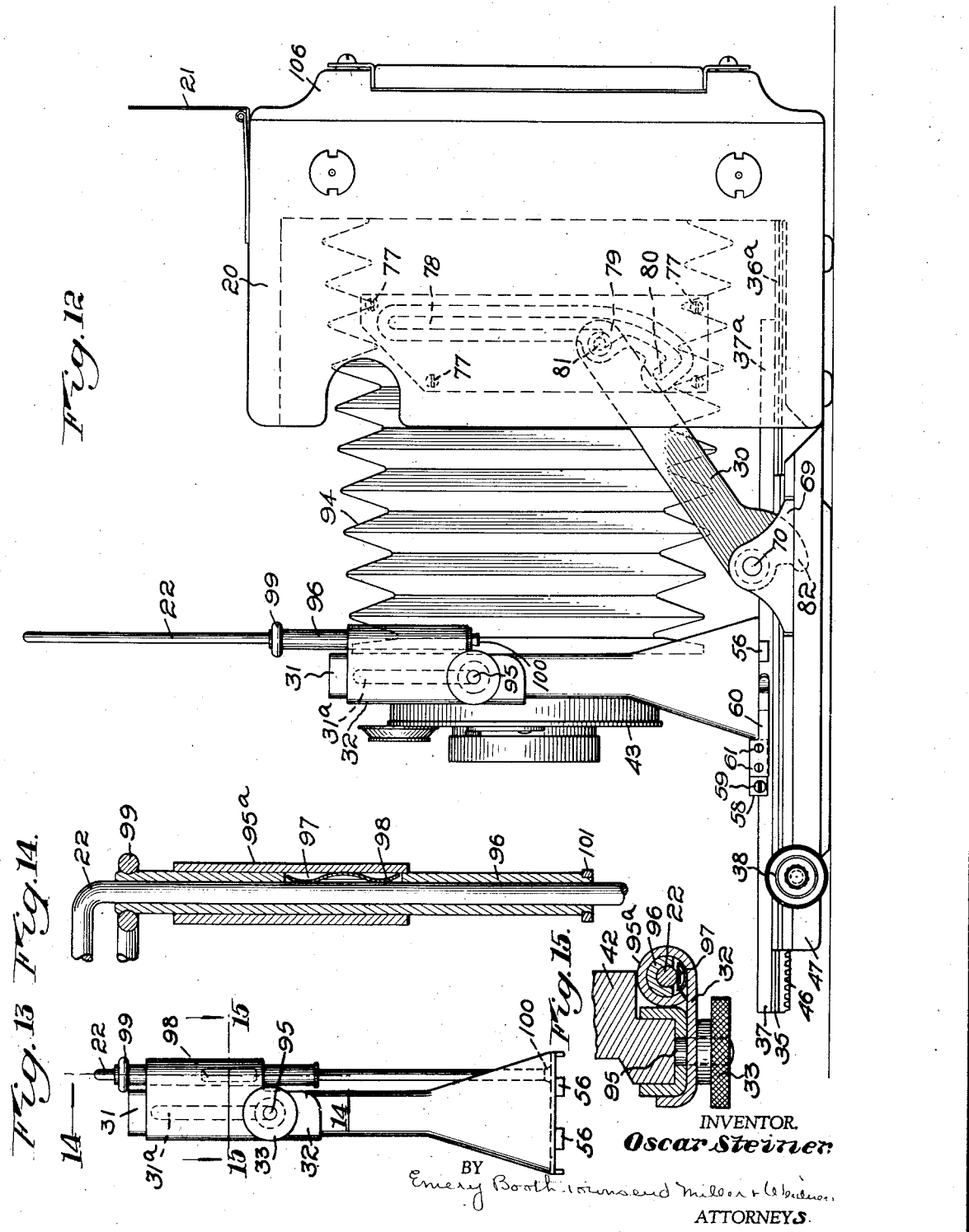

Patented Dec. 2, 1941

2,264,777

UNITED STATES PATENT OFFICE 2,264,777

PHOTOGRAPHIC CAMERA STRUCTURE

Oscar Steiner, Irondequoit, N. Y., assignor to The Folmer Graflex Corporation, Rochester, N. Y., a corporation of Delaware Application December 15, 1939, Serial No. 309,385

34 Claims. (Cl. 95—40)

This invention relates to photographic camera structures for general use, but particularly adapted to focal plane shutters of the well-known Graphic type of The Folmer Graflex Corporation, without in any sense being limited thereto.

In order that the principle of the invention may be readily understood, I have disclosed a single embodiment thereof in the accompanying drawings, wherein—

Fig. 2 is a top plan view thereof, with part of the camera box or body cut away to show more clearly the construction of the camera bed and the camera track;

Fig. 3 is a cross sectional view of Fig. 2 on the line 3—3 thereof;

Fig. 4 is a side elevation of the camera with the front bed thereof in position for wide angle work, and with the camera front frame or assembly partially extended;

Fig. 5 is an enlarged longitudinal sectional detail of part of the structure illustrated in Fig. 4, showing the bed-hinge construction and the automatic bed-stop in operating condition;

Fig. 6 is a detail in longitudinal section of the camera bed when opened to the horizontal position, showing the automatic bed-stop in non-operative position;

Fig. 7 is a transverse section of the camera front frame or assembly, showing the clamping means therefor, the said frame or assembly being here shown as clamped to the camera track;

Fig. 8 is a transverse sectional view similar to Fig. 7, but with the clamping means shown in released position;

Fig. 9 is a bottom plan view of Fig. 8;

Fig. 10 is a vertical section taken through Fig. 8 on the line 10—10 thereof;

Fig. 11 is a detail in enlarged longitudinal section of one of the camera side arms, illustrating the manner of "spring loading" the same;

Fig. 12 is a side elevation of the camera with the entire bed in a horizontal position, and with the camera front frame or assembly extended to the infinity position, and showing in dotted lines one of the side arm guides;

Fig. 13 is a side elevation of the camera yoke, showing the wire frame finder in the collapsed condition;

Fig. 14 is a longitudinal section taken through Fig. 13 on the lines 14—14 thereof; and Fig. 15 is a detail in horizontal section taken through Fig. 13 on the line 15—15 thereof.

Figure 1:
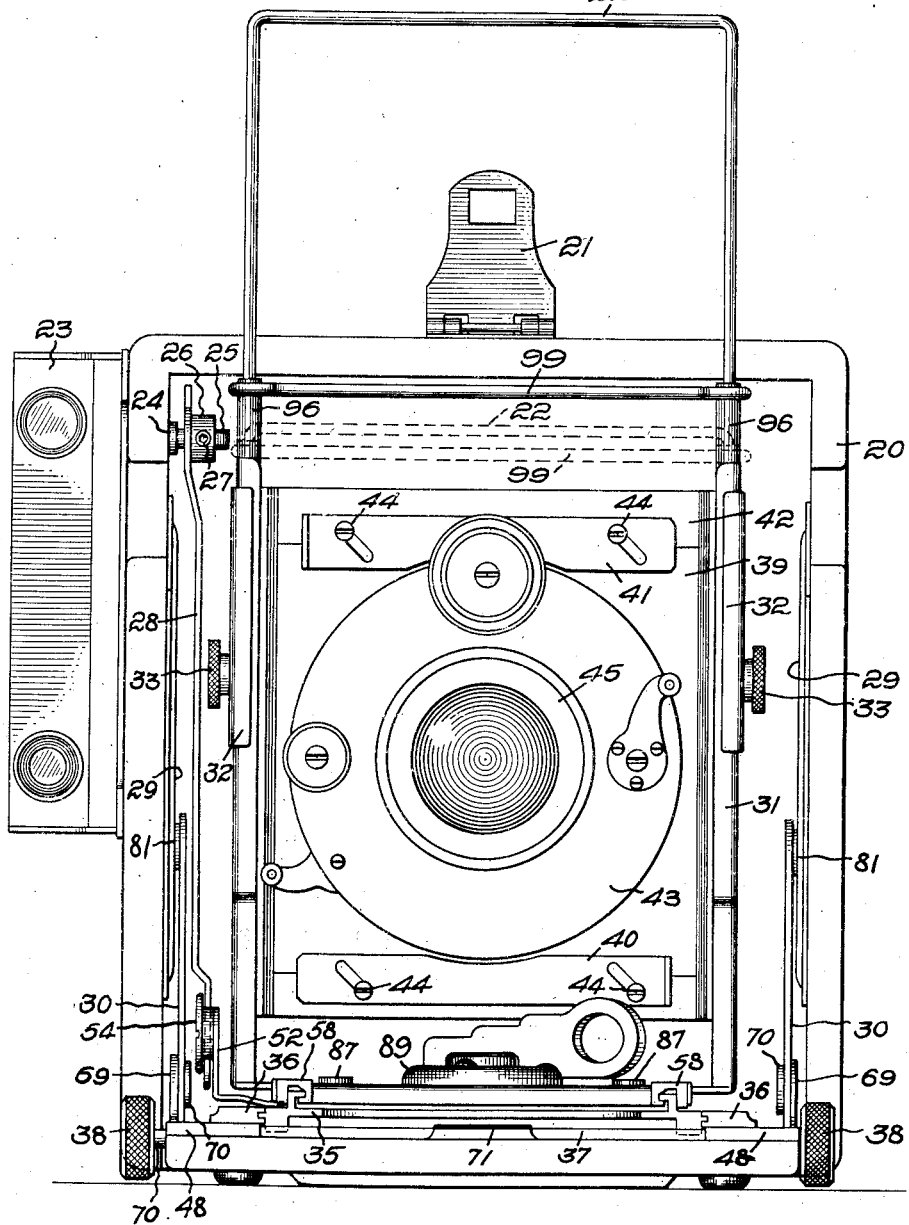
Fig. 1 is a front elevation of the camera with the camera bed open, the camera front frame or assembly pulled partially out, and the direct vision wire finder in position for use.

Certain of the features herein are disclosed and claimed in my co-pending application Ser. No. 307,637, now Patent No. 2,233,352, February 25, 1941.

Referring first to Figs. 1 and 12 disclosing the general structure of the camera and which, except as herein claimed, may be of any suitable structure, the camera box is indicated at 20 in Figs. 1 and 12. It may be of the general Graphic type of the Folmer Graflex Corporation that is provided with a focal plane shutter, or of any other suitable type. The view finder peep-sight is indicated at 21 and the wire frame finder at 22. A range finder, which so far as this application is concerned may be of any suitable type but which is preferably of the type shown in my co-pending application Ser. No. 311,568, filed December 29, 1939, is indicated at 23. It is provided with a laterally extending hub 24 having a shaft 25 passing therethrough and on which is mounted a hub 26, held in place by a screw 27. To the said hub 26 is riveted a range finder operating arm 28. The purpose of the said structure will be sufficiently described at a later point herein. The camera side arm guide plates are indicated at 29, 29 and the camera side arms at 30, 30.

Referring more particularly to Figs. 1 and 12 to 15, the camera yoke channels are indicated at 31 having slots 31a, 31a (best shown in Fig. 12). View finder brackets are indicated at 32, 32 as held to the yoke channels by means of nuts 33, 33. The camera front frame or assembly is provided with a clamping handle or lever 34, best shown in Figs. 2, 7 and 8.

The camera is provided with a track made up of the main body or forward part 35 and the attached rear part 35a for which are respectively provided guides 36, 36 and 36a, 36a, wherein the said track parts are free to slide. The camera bed, which underlies the said track members, as best shown in Fig. 3, is indicated generally at 37 and the focusing knobs therefor are indicated at 38, 38 in Figs. 1, 2, 4 and 12. The lens board is indicated at 39. It is provided with a lower lens-board latch 40 and an upper lens-board latch 41. The bellows frame is indicated at 42, and the between-the-lens shutter is indicated at 43. The said shutter is normally mounted on the lens board 39, which is held in place in the camera bellows frame 42 under the influence of the said latches 40, 41, which are attached to the said bellows frame 42 by screws 44, 44. The means provided for effecting the vertical adjustment of the said bellows frame will be fully described at a later point. The camera or objective lens is indicated at 45.

The camera track composed of the two members 35, 35a, constitutes an important feature of my invention. As above stated, it is made up of the forward part or member 35 and the attached rear part or member 35a. These two parts or members are always coupled together, preferably by hinge construction, thus pivotally connecting them together along transverse edges extending transversely to the direction of in-and-out movement of said two-part track. The said forward track member 35 is provided with gear teeth 46, 46. The focusing knobs 38, 38, already referred to, are fast on a through shaft 47 which extends through the holes (not shown) in the camera bed bolsters 48, 48, which are best shown in Fig. 3. The said through shaft 47 is also provided with pinions (not shown) for meshing with the gear teeth 46, 46 of the forward track member 35.

The turning of the focusing knobs 38, 38 in a clockwise direction will cause said forward track member 35 to be moved outward, and in consequence the rear track member 35a will also be moved outward because the said two track members 35, 35a are coupled by links 49, 50 by means of pins 51, 51, shown in Fig. 5 and in dotted lines in Fig. 2. The purpose in separating the tracks into two portions, namely, the forward part or member 35 and the rear part or member 35a, is to permit the camera bed 37 to be closed or to allow the said bed 37 to be dropped down for wide angle work, as shown in Fig. 4, while at the same time maintaining a coupled condition between the said forward track member 35 and the said rear track member 35a.

It will be seen from the foregoing description that any movement of the said forward track member 35 transmits a like movement to the rear track member 35a. To the said rear track member 35a is attached an angle plate 52, as best shown in Figs. 1 and 2, by means of rivets 53, 53, and attached to the said angle plate 52 is a shoulder stud 54. Inasmuch as the arm 28, most clearly shown in Fig. 1, is "spring loaded," and is caused to move in a forward direction, any motion of the forward track member 35 will be transmitted to the said range finder arm 28 through the medium of the track connecting means 49, 50, the rear track member 35a, the angle plate 52 and the stud 54.

There is thus provided means for transmitting motion to the range finder arm 28 regardless of the position of the camera front frame or assembly indicated generally at 55, and this constitutes an important feature of my invention. Even though the camera bed 37 is in the position shown in Fig. 4, any motion of the forward track member 35 is likewise transferred to the rear track member 35a and thence to the range finder arm 28, as previously set forth. This construction provides means for coupling wide angle lenses to the range finder.

The said camera front frame or assembly 55 is provided with guides 56, 56, best shown in Figs. 7, 8, 9, which overlie the outside edge of the track rails 57, 57 of the forward track member 35. Attached to the said track rails 57, 57 are infinity stop blocks 58, 58, shown in Figs. 1 and 2 as locked to the track rails 57, 57 by screws 59, 59. The said infinity stop blocks are provided with springs 60, 60, shown in dotted lines, Fig. 2 as attached to the respective infinity blocks by screws 61, 61, that overlie the forward turned-down guides 56, 56, thus holding the camera front frame or assembly 55 in position upon the forward track member 35 even though the clamp handle or lever 34 is in the released position.

As shown in Fig. 2, the camera is also provided with focusing scales of the vernier type. One of the said scales 62 is mounted on a camera track guide 36 by means of screws 63, 63. The other scale 64 is mounted on the forward track member 35 by means of screws 65, 65.

The details of the camera bed structure are best shown in section in Fig. 3. Therein the camera bed 37 is represented as made up of a pressed metal door-like structure 66 covered with leather as indicated at 67. To the said metal portion 66 are attached the bolster blocks 48, previously referred to, by means of screws (not shown), and to the said bolster blocks 48 are attached the track guide rails 36 by means of screws 68. The metal camera bed 37 has upwardly extending lips on the sides forming bosses 69, 69, as shown in Fig. 1. Thereto are attached the two camera side arms 30 by means of rivets 70, 70. The rear portion of the camera bed 37 is formed or provided with a hinged structure, most clearly shown in Figs. 5, 6 and 11, and hereinafter more fully referred to. The front of the camera bed 37 is formed or provided with a bent-over lip 71, show in Fig. 2, which forms a latch for the camera bed when in the closed position.

As shown in Fig. 2, the rear track member 35a has attached thereto stop pins 72, 72, which provide stopping means for the camera front frame or assembly 55, when the latter is pushed all the way to the rear, as best shown in Fig. 2. The forward track member 35 is locked in adjusted position by means of a lever 73, shown in Fig. 2. Movably received in a recess in one of the bolsters 48 is a block 74, shown in dotted lines in Fig. 2. Thereto is attached a threaded stud 75 passing through a hole in the adjacent guide rail 36, and also engaged by said locking lever 73 through the provision of a threaded connection with the stud 75. When the said locking lever 73 is pushed in a contraclockwise direction viewing Fig. 2, the block 74 is thrust away from the forward track member 35, thus allowing free movement of said forward track member 35. When the said lever 73 is moved in a clockwise direction, the block 74 is caused to clamp the lower side of the said forward track member 35, thus holding the said forward track member 35 from moving so long as the lever 73 is in said position.

The wide-angle position of the camera bed 37 is shown in Figs. 4 and 5. The camera front frame or assembly 55 remains on the rear track member 35a, as is evident from Fig. 4. Focusing is accomplished by turning the focusing knobs 38, 38 (Figs. 1, 4 and 12) in a clockwise direction so as to move the objective lens 45 forward and in a contraclockwise direction to move said lens to the rear.

As the knobs 38, 38 are turned, the forward track member 35 is caused to move forward and backward, as previously explained, and the motion of the said forward track member 35 is transmitted to the rear track member 35a through links 49, 50, thus moving the rear track member 35a at the same time that the forward track member 35 is moved. As said forward track member 35 is moved outward or forward, moving with it the said rear track member 35a, the latter would in time pull entirely out of the track guides 36a. To prevent this, each connecting link 49, 50 is provided with an extending arm 75, best shown in Fig. 5, and which is caused to swing downward and engage a stop plate 76, as also shown in Fig. 5, thus preventing further movement of the said rear track member 35a. When, however, the camera is held in a normal or horizontal position, the said extending arm 75 also lies in a horizontal position and this permits the rear track member 35a to leave the track guides 36a and to engage the track guides 36, thus allowing full movement of the forward track member 35 in a forward direction.

A further reason for providing a stop on the rear track member 35a is that as the said forward track member 35 is moved forward, the rear track member 35a moves forward, causing the angle to change between the two pivot pins 51, 51 until they reach a point where undue strain would be put on both the forward track member 35 and the rear track member 35a if the forward track member 35 were allowed to be racked out too far.

As best shown in Figs. 4, 5, 11 and 12, the camera case 20 is provided with side arm guide plates or brackets 29, 29, previously referred to, one being on either side of the camera case and held to the camera walls by screws 77, 77, shown in dotted lines in Figs. 4 and 12. Each side arm plate or bracket 29 is provided with a slot 78 having laterally extending angular slot portions 79, 80, shown in dotted lines in Figs. 4 and 12. The said side arms 30, previously referred to, are provided with shoulder rivets 81, 81, riding in the respective slots 78. When the entire camera bed is in the closed position, each side arm shoulder rivet 81 will be in position near the top of the respective slot 78, and when the entire camera bed 37 is in the horizontal position, said rivets will be in the position shown in Fig. 12, and when the bed 37 is lowered to the wide angle position, each shoulder rivet 81 will be in the position shown in Fig. 4, that is, in the lowermost notches 80.

To hold the said side arms 30 in these respective positions, I have, as best shown in Figs. 5 and 11, provided a lip 82 on the lower end of each arm 30, each of which lips engages a block 83 which is thrust forward under the influence of spring 84. Each block 83 with its spring 84 lies in a groove provided therefor in the respective bolster member 48.

Thus there is always pressure applied to each side arm 30 tending to move it in a contraclockwise direction, thus holding the respective shoulder rivet 81 in engagement with slot 79 or slot 80, whichever position is selected.

In order to close the camera, whether it be in the wide angle position or in the horizontal position, it is merely necessary to apply inward pressure to the side arms 30, causing them to be thrust back, and thus disengaging each shoulder rivet 81 either from slot 79 or from slot 80, whichever it may have been in, thus allowing each shoulder rivet to travel in its respective slot 78 and allowing the camera to be closed.

The bed hinge structure will be described at a subsequent point.

The camera front frame or assembly shown in Figs. 7 to 10 and already partially described, is not claimed herein per se, but is so claimed in my co-pending application Ser. No. 307,627, now Patent No. 2,233,352.

Referring further to Figs. 7 to 10, the camera front frame or assembly proper 55, described as having upright side arms 31 with turned-down portions or guides 56 received in a guiding relation upon the bed rails 57, 57, is so constructed that it can be moved along either forward track member 35 and/or rear track member 35a, and clamped in any position thereon. In so far as the said camera front frame or assembly 55 peculiarly cooperates with both the forward track member 35 and the rear track member 35a, it is claimed in combination therewith in this application, though as to its capacity for a lateral shifting movement or its construction per se, it is claimed in my said co-pending application Ser. No. 307,627, now Patent No. 2,233,352.

Heretofore, there have been devised numerous clamping means for the front frames or assemblies of photographic cameras, but so far as I am aware none of these has proven entirely satisfactory, particularly for cameras provided with unusually large or heavy lenses. The structure herein disclosed is a marked improvement on previous structures known to me, and particularly in that it has great rigidity combined with ease of operation.

The structure next to be described is shown and is claimed per se in my said co-pending application Ser. No. 307,627, now Patent No. 2,233,352.

Attached to the lower side of the front frame or assembly 55 are metal clamp plates 86, 86, being attached to said frame or assembly 55 by means of shoulder rivets 87, 87, and passing through holes in said frame or assembly 55, as shown in Figs. 7, 8, 9 and 10.

Between the camera front frame or assembly 55 and each clamp plate 86 is mounted a spring 88 to cause such clamp plate or member 86 to move away from the adjacent rail 57. Attached to the camera front frame or assembly 55 is a metal member 89 of flattened cup shape, to which is attached the clamping handle or lever 34, previously referred to, the said member 89 having recesses or pockets 90, 90, best shown in Figs. 2 and 8. The said camera front frame or assembly 55 is provided with holes underlying the recesses or pockets 90 of the said member 89, in which are positioned ball bearings 91, 91. The under side of said ball bearings 91, 91 rest upon the clamp plates 86, 86. When the clamping handle or lever 34 is in the position shown in Fig. 8, the balls 91, 91 are thrust up into the recesses or pockets 90, 90 of the member 89, thus allowing the clamp plates 86, 86 to follow the balls, thereby relieving their clamping action on the rails 57, 57 as shown in Fig. 8. The said member 89 is held to the front frame or assembly 55 by means of a fillister head screw 92 that is threaded into a hole in the front frame or assembly 55 and is therein locked by a lock nut 93. When the clamping handle or lever 34 is positioned as shown in Figs. 2 and 7, the balls 91, 91 are thrust downward, thereby locking the clamping plates 86, 86 and thus clamping the camera front frame or assembly 55 rigidly to the rails 57, 57. This relatively simple structure has greater strength and rigidity than any clamping device for the purpose known to me.

I will next describe the view finder and bellows frame, and in doing so will refer particularly to Figs. 12 to 15.

In Fig. 12, the camera is shown with the bed 37 thereof in a horizontal position, the camera bellows 94 being extended and the wire finder 22 and the peep-sight 21 being both in operating position. The structure of the said wire finder is clearly shown in Figs. 1 and 12 to 15. Referring first to Figs. 1 and 12, the bellows frame 42 is provided with two laterally extending studs 95, 95, one of which is also shown in Fig. 13. Onto the said studs are threaded the nuts 33, 33, shown also in Fig. 1. The upright side rails 31, 31 are provided with slots 31a, 31a, as indicated in dotted lines in Fig. 13. This construction provides for a vertical adjustment of the bellows frame 42 which, as previously stated, carries the objective lens 45. The view finder brackets 32, 32 have holes provided to slide over the said studs 95, 95, as shown in Fig. 15, and are held in place by the said threaded nuts 33, 33. Any movement of the bellows frame 42 up or down causes a like movement of the view finder brackets 32, 32. Therefore, if the front of the camera is raised, thereby raising the center of the objective lens 45, the view finder itself is also raised, thereby correcting the view as seen through the view finder.

Each view finder bracket 32 is so shaped that it fits over the adjacent side rail 31 and the rear portion thereof is formed into a cylinder 95a, as clearly shown in vertical section in Fig. 14 and in transverse section in Fig. 15. In each said cylindrical portion 95a slides a second cylinder 96 having a cut-out portion 97 in which lies a spring 98 having a wave-shaped formation, and which, as best shown in Fig. 14, exerts a pressure against the cylindrical portion 95 and the wire frame member 22, thus holding said parts 22, 96 in any position in the cylindrical portion 95a of the said wire frame member 22. Attached to each said cylindrical member 96 is a second wire cross member 99, shown in Fig. 1 and forming the lower portion of the view finding frame.

It will be observed that the described construction provides a very rigid, wire frame, view finder that can be collapsed when closing the camera and can be raised to operating position and automatically held in place. The lower end of the view finder member 22 is headed over as illustrated at 100 in Fig. 13. The lower end of each cylinder 96 has riveted thereon a stop collar 101, as most clearly shown in Fig. 14. There are thus provided two stops in the same horizontal plane which co-act when the view finder is pulled all the way up. In Fig. 1, the wire finder is shown in full lines in fully elevated position and in dotted lines in the collapsed position.

Referring now to the hinge structure pertaining to the bed 37 and which co-acts with the structure of forward track member 35 and rear track member 35a, and directing attention particularly to Figs. 5 and 6, the said bed 37 is made up of or furnished with the metal frame 66 previously referred to. It is provided with a hinge 102 and a hinge pin 103. The camera box 20 is provided with a hinge member 104, which is attached to the camera box 20 by means of screws 105 passing through holes in the bottom of the camera box 20 and through holes in the hinge member 104, and finally are threaded into the guide rails 36a, 36a, thus securing both guide rails and hinge member rigidly to the camera box 20. The camera is also provided with the usual ground glass back 106 shown in Fig. 4, and which is so well known as to need no further description here.

I will now describe the operation of the camera in so far as the same is necessary.

In the operation of the camera, it is necessary first to open out the camera bed 37 which forms the door of the camera, and for taking pictures with a lens of normal focal length the said bed 37 is allowed to stop in a horizontal position. The camera front frame or assembly 55 carrying the camera or objective lens 45 will be in position all the way back in the camera box 20. The clamping handle or lever 34 will be in the position shown in full lines in Fig. 2 and in Fig. 7, and it is then turned into the position shown in dotted lines in Fig. 2. The camera front frame or assembly 55 can then be pulled out on the track rails 57, 57 to the position shown in Fig. 2, at which position the said front frame or assembly 55 will be stopped against infinity stops 58, 58 and will be held in position by the springs 60, 60. The clamping handle or lever 34 is then moved into the full line position shown in Fig. 2, thus clamping the said front frame or assembly 55 to the camera forward track member 35. Then normal focusing takes place through the act of turning the focusing knobs 38 either forward or backward depending on the direction in which it is necessary to move the objective lens 45.

To close the camera again, the focusing knobs 38, 38 are turned all the way back until the rear track member 35a is in the extreme back position in the camera box 20. The front frame or assembly 55 is then pushed back into the camera box 20. The clamping handle or lever 34 is turned back into the position shown in full lines in Fig. 2, thus clamping the camera front frame or assembly 55 and holding the bellows 94 compressed or compacted in the camera box 20. The door thereof can then be closed by depressing the side arms 30, 30 to the fullest extent possible, and turning the camera bed 37 upward into full vertical position, where it latches.

The camera herein disclosed is of great ruggedness and stability, and has unusual versatility in operation. No additional adjustments have to be made for the use of wide angle lenses nor are any auxiliary focusing means necessary. At no time does the camera front frame or assembly leave the camera track for the making of the various adjustments, and means are provided as herein disclosed for automatically limiting the movement of the track members 35 and 35a when the camera is used for wide angle work. Furthermore, the invention provides a very rigid means for supporting and permitting the operation of the range finder operating means. The wire frame finder presents novel structure that is compact and rigid, and which may be readily brought into its various required positions, and particularly with respect to the vertical positioning of the camera front frame or assembly.

Having thus described one illustrative embodiment of the invention, it is to be understood that although specific terms are employed, they are used in a generic and descriptive sense and not for purposes of limitation, the scope of the invention being set forth in the following claims.

I claim:

1. A photographic camera structure including a box or casing having a bed hinged thereto to constitute a door when closed, and a two-part track supported and guided upon said bed and the inside of the bottom of said box or casing, the forward member of said track being so pivotally connected to the rear member thereof that in use the forward member may be turned down below the horizontal plane to facilitate the use of wide-angle lenses, the said bed being also foldable downward below a horizontal plane with the forward member of the track, and means cooperating therewith to prevent the withdrawal of the said rear member from the inside of the bottom of said box or casing when the forward member of the track is turned down below a horizontal plane.

2. A photographic camera structure including a box or casing having a bed hinged thereto to constitute a door when closed, and a two-part track supported and guided upon said bed and the inside of the bottom of said box or casing, said two-part track including a rear member and a forward member pivoted together, and while so pivoted said forward member being capable of being turned down below a horizontal plane to facilitate the use of wide-angle lenses.

3. A photographic camera structure including a box or casing having a bed hinged thereto to constitute a door when closed, and a two-part track supported and guided upon said bed and the inside of the bottom of said box or casing, said two-part track including a rear member and a forward member, both of substantially the same full-track width and pivotally connected together along their edges extending transverse to the direction of in-and-out movement of said track, the said forward member being capable of being turned down below a horizontal plane to facilitate the use of wide-angle lenses.

4. A photographic camera structure including a box or casing having a bed hinged thereto to constitute a door when closed, and a track supported and guided upon said bed and the inside of the bottom of said box or casing, a range finder secured to the said box or casing so as to constitute therewith a unitary structure, said track consisting of a forward member and a rear member, both of substantially the same full-track width and hinged together and guided upon said bed, and means connecting the movable element of the range finder with the rear track member so that the two move in unison.

5. A photographic camera structure including a box or casing having a bed hinged thereto to constitute a door when closed, and a two-part track supported and guided upon said bed and the inside of the bottom of said box or casing, the forward member of said track being so coupled to the rear member thereof that in use the forward member may be turned down below the horizontal plane to facilitate the use of wide-angle lenses, the said bed being also foldable downward below a horizontal plane with the forward member of the track.

6. A photographic camera structure including a box or casing having a bed hinged thereto to constitute a door when closed, and a two-part track supported and guided upon said bed and the inside of the bottom of said box or casing, the forward member of said track being so coupled to the rear member thereof that in use the forward member may be turned down below the horizontal plane to facilitate the use of wide-angle lenses, the said bed being also foldable downward below a horizontal plane with the forward member of the track, and a front frame assembly guidable along both of said members of the track in the use of the camera, and in use always retained on one or the other of said members.

7. A photographic camera structure including a box or casing having a bed hinged thereto to constitute a door when closed, and a two-part track supported and guided upon said bed and the inside of the bottom of said box or casing, said two-part track comprising a forward member and a rear member hinged together, and adapted to have a front frame assembly of the camera guided and moved along both of said parts in the use of the camera, and therefore constituting the constant support of such front face assembly, and manually operable means for holding the forward track member in selected position of adjustment along the bed.

8. A photographic camera structure including a box or casing having a bed hinged thereto to constitute a door when closed, and a track consisting of two parts foldably connected together and as an entirety supported and guided upon said bed and the inside of the bottom of said box or casing, and adapted to have a front frame assembly of the camera guided and moved along both of said parts in the use of the camera, and therefore constituting the constant support of such front frame assembly.

9. A photographic camera structure including a box or casing having a bed hinged thereto to constitute a door when closed, and a two-part track supported and guided upon said bed and the inside of the bottom of said box or casing, said two-part track comprising a forward member and a rear member hinged together, said two members adapted to have a front frame assembly of the camera guided and moved along both of them in the use of the camera, and therefore constituting the constant support of such front frame assembly.

10. A photographic camera structure including a box or casing having a bed hinged thereto to constitute a door when closed, and a two-part track supported and guided upon said bed and the inside of the bottom of said box or casing, said two-part track comprising a forward member and a rear member, and links pivotally connecting said members together, said two members adapted to have a front frame assembly of the camera guided and moved along both of them in the use of the camera, and therefore constituting the constant support of such front frame assembly.

11. A photographic camera structure including a box or casing having a bed hinged thereto to constitute a door when closed, and a two-part track supported and guided upon said bed and the inside of the bottom of said box or casing, the forward member of said track being so pivotally connected to the rear member thereof that in use the forward member may be turned down below the horizontal plane to facilitate the use of wide angle lenses, the said bed being also foldable downward below a horizontal plane with the forward member of the track.

12. A photographic camera structure including a box or casing having a bed hinged thereto to constitute a door when closed, and a two-part track supported and guided upon said bed and the inside of the bottom of said box or casing, said two-part track comprising a forward member and a rear member hinged together, and automatically acting means to prevent the withdrawal of the rear member from the inside of the bottom of said box or casing when the forward part of the track is turned down below a horizontal plane.

13. A photographic camera structure including a box or casing having a bed hinged thereto to constitute a door when closed, and a two-part track supported and guided upon said bed and the inside of the bottom of said box or casing, said two-part track comprising a forward member and a rear member hinged together and so pivotally connected that the forward member may be turned down below the horizontal plane to facilitate the use of wide angle lenses, and automatically acting means to prevent the withdrawal of the rear member of the track from the inside of the bottom of said box or casing when the said forward member has been turned down below the horizontal plane.

14. A photographic camera structure including a box or casing having a bed hinged thereto to constitute a door when closed, and a two-part track supported and guided upon said bed and the inside of the bottom of said box or casing, said two-part track comprising a forward member and a rear member hinged together and so pivotally connected that the forward member may be turned down below the horizontal plane to facilitate the use of wide angle lenses, and automatically acting means to prevent the withdrawal of the rear member of the track from the inside of the bottom of said box or casing when the said forward member has been turned down below the horizontal plane, said automatically acting means including links pivotally connecting said forward and rear members and provided with formations to engage the bed.

15. A photographic camera structure including a box or casing having a bed hinged thereto to constitute a door when closed, and a two-part track supported and guided upon said bed and the inside of the bottom of said box or casing, said two-part track comprising a forward member and a rear member hinged together and so pivotally connected that the forward member may be turned down below the horizontal plane to facilitate the use of wide angle lenses, and automatically acting means to prevent the withdrawal of the rear member of the track from the inside of the bottom of said box or casing when the said forward member has been turned down below the horizontal plane, said automatically acting means including a stop formation upon the bed and a movable part connected to the track and engaging said stop formation when the forward part of the track has been turned downward to a predetermined extent below the horizontal plane.

16. A photographic camera structure including a box or casing having a bed hinged thereto to constitute a door when closed, and a two-part track supported and guided upon said bed and the inside of the bottom of said box or casing, said two-part track comprising a forward member and a rear member, links pivotally connecting said members together, at least one of said links having an extending part adapted, when the forward member of the track is folded down below the horizontal plane, to engage the bed, said bed having a stop formation to be so engaged by said extending part.

17. A photographic camera structure including a box or casing having a bed hinged thereto to constitute a door when closed, the inside of the bottom of said box or casing constituting a rear part of the bed, said entire bed having spaced, longitudinally extending side guides, and a two-part track supported and guided upon the hinged part of the bed and the inside of the bottom of the box or casing, said two-part track comprising a forward member guided upon the hinged portion of the bed and a rear member guided in its initial position upon the said inside of the bottom of the box or casing, said hinged part of the bed being constructed, because of its hinge, to be turned down below the horizontal plane, and the two members of the track being hinged together, said forward track member being foldable with the hinged part of the bed below the horizontal plane.

18. A photographic camera structure including a box or casing having a bed hinged thereto to constitute a door when closed, the inside of the bottom of said box or casing constituting a rear part of the bed, said entire bed having spaced, longitudinally extending side guides, and a two-part track supported and guided upon the hinged part of the bed and the inside of the bottom of the box or casing, said two-part track comprising a forward member guided upon the hinged portion of the bed and a rear member guided in its initial position upon the said inside of the bottom of the box or casing, said hinged part of the bed being constructed, because of its hinge, to be turned down below the horizontal plane, and the two members of the track being hinged together, said forward track member being foldable with the hinged part of the bed below the horizontal plane, and automatically-acting stop means to prevent the rear part of the track from being withdrawn from the inside of the bottom of the box or casing if the said bed and the forward member of the track are positioned below the horizontal plane.

19. A photographic camera structure including a box or casing having a bed hinged thereto to constitute a door when closed, the inside of the bottom of said box or casing constituting a rear part of the bed, said entire bed having spaced, longitudinally extending side guides, and a two-part track supported and guided upon the hinged part of the bed and the inside of the bottom of the box or casing, said two-part track comprising a forward member guided upon the hinged portion of the bed and a rear member guided in its initial position upon the said inside of the bottom of the box or casing, said hinged part of the bed being constructed, because of its hinge, to be turned down below the horizontal plane, and the two members of the track being hinged together, said forward track member being foldable with the hinged part of the bed below the horizontal plane, and automatically-acting stop means to prevent the rear part of the track from being withdrawn from the inside of the bottom of the box or casing if the said bed and the forward member of the track are positioned below the horizontal plane, said automatically-acting stop means being non-operative when the forward track member and the bed are in a horizontal plane, whereby the rear member of the track may then be pulled forward out of said box or casing onto the said hinged part of the bed.

20. A photographic camera structure including a box or casing having a bed hinged thereto to constitute a door when closed, and a two-part track supported and guided upon said bed and the inside of the bottom of said box or casing, said two-part track comprising a forward member and a rear member hinged together, so that in use the forward member may be turned down below the horizontal plane to facilitate the use of wide-angle lenses, the said bed being also foldable downward below a horizontal plane with the forward member of the track, and manually operable means for holding the forward track member in selected position of adjustment along the bed.

21. A photographic camera structure including a box or casing having a bed hinged thereto to constitute a door when closed, and a two-part track supported and guided upon said bed and the inside of the bottom of said box or casing, said two-part track comprising a forward member and a rear member hinged together, so that in use the forward member may be turned down below the horizontal plane to facilitate the use of wide-angle lenses, the said bed being also foldable downward below a horizontal plane with the forward member of the track, and manually operable means for holding the forward track member in selected position of adjustment along the bed, said means including a lever 73 and a movable block 74 adapted in one position to clamp the said forward track member and in its other position to allow free movement thereof.

22. A photographic camera structure including a box or casing having a bed hinged thereto to constitute a door when closed, and a two-part track supported and guided upon said bed and the inside of the bottom of said box or casing, said two-part track including a rear member and a forward member both of substantially the same full-track width and coupled together, and while so coupled the said forward member being capable of being turned down below the horizontal plane to facilitate the use of wide angle lenses.

23. A photographic camera structure including a box or casing having a bed hinged thereto to constitute a door when closed, and a two-part track supported and guided upon said bed and the inside of the bottom of said box or casing, said two-part track including a rear member and a forward member both of substantially the same full-track width and coupled together, and while so coupled the said forward member being capable of being turned down below the horizontal plane to facilitate the use of wide angle lenses, and one or more camera side arms pivotally connected to the camera bed and extending into the said box or casing, the latter having guiding means with which said side arm or arms is or are engageable.

24. A photographic camera structure including a box or casing having a bed hinged thereto to constitute a door when closed, and a two-part track supported and guided upon said bed and the inside of the bottom of said box or casing, said two-part track including a rear member and a forward member hingedly connected together, and while so hingedly connected said forward member being capable of being turned down below the horizontal plane to facilitate the use of wide angle lenses, and one or more camera side arms pivotally connected to the camera bed and extending into the said box or casing, the latter having a guiding formation for each said side arm or side arms, and having parts to engage and hold said side arms with' the said bed either in a horizontal plane or below the horizontal plane.

25. A photographic camera structure including a box or casing having a bed hinged thereto to constitute a door when closed, and a two-part track supported and guided upon said bed and the inside of the bottom of said box or casing, said two-part track including a rear member and a forward member of substantially the same full-track width and connected together, and while so connected said forward member being capable of being turned down below the horizontal plane to facilitate the use of wide angle lenses, and one or more camera side arms pivotally connected to the camera bed and extending into the said box or casing, the latter having guiding slots 78 to receive said side arms, with offset notches to be engaged by said side arms in different positions.

26. A photographic camera structure including a box or casing having a bed hinged thereto to constitute a door when closed, and a two-part track supported and guided upon said bed and the inside of the bottom of said box or casing, said two-part track including a rear member and a forward member of substantially the same full-track width and connected together, and while so connected said forward member being capable of being turned down below the horizontal plane to facilitate the use of wide angle lenses, and one or more camera side arms pivotally connected to the camera bed and extending into the said box or casing, the latter having guiding slots 78 to receive said side arms, with offset notches to be engaged by said side arms in different positions, said side arms being adapted to be disengaged from said notches by the manual application of inward pressure against said side arms, and spring means acting upon said side arms and tending to hold them in their functioning positions.

27. A photographic camera structure including a box or casing having a bed hinged thereto to constitute a door when closed, and a two-part track supported and guided upon said bed and the inside of the bottom of said box or casing, said two-part track comprising a forward member and a rear member hinged together, said camera structure having a bellows frame and a front frame assembly connected together, said front frame assembly being guidable along both said forward member and said rear member of the track, and constantly supported on one or the other thereof.

28. A photographic camera structure including a box or casing having a bed hinged thereto to constitute a door when closed, and a two-part track supported and guided upon said bed and the inside of the bottom of said box or casing, said two-part track comprising a forward member and a rear member hinged together, said camera structure having a bellows frame and a front frame assembly connected together, said front frame assembly being guidable along said forward member and said rear member of the track, and constantly supported on one or the other thereof, the rear track member having stop means to limit the inward movement of the said front frame assembly.

29. A photographic camera structure including a box or casing having a bed hinged thereto to constitute a door when closed, and a two-part track supported and guided upon said bed and the inside of the bottom of said box or casing, said two-part track comprising a forward member and a rear member hinged together, said camera structure having a movable front frame assembly supported and guided at all times upon one or the other of said track members.

30. A photographic camera structure including a box or casing having a bed hinged thereto to constitute a door when closed, and a two-part track supported and guided upon said bed and the inside of the bottom of said box or casing, said two-part track comprising a forward member and a rear member hinged together, said camera structure having a movable front frame assembly supported and guided at all times upon one or the other of said track members, and means to clamp said front frame assembly to either member of said track.

31. A photographic camera structure including a box or casing having a bed hinged thereto to constitute a door when closed, and a two-part track supported and guided upon said bed and the inside of the bottom of said box or casing, said two-part track comprising a forward member and a rear member hinged together, said camera structure having a movable front frame assembly supported and guided at all times upon one or the other of said track members, and means for detachably holding the said front frame assembly in any desired position of adjustment along said two-part track.

32. A photographic camera structure including a box or casing having a bed hinged thereto to constitute a door when closed, and a track supported and guided upon said bed and the inside of the bottom of said box or casing, a range finder secured to the said box or casing so as to constitute therewith a unitary structure, said track consisting of a forward member and a rear member hinged together and guided upon said bed, and means connecting the movable element of the range finder with the rear track member so that the two move in unison.

33. A photographic camera structure including a box or casing having a bed hinged thereto to constitute a door when closed, and a track supported and guided upon said bed and the inside of the bottom of said box or casing, a range finder secured to the said box or casing so as to constitute therewith a unitary structure, said track consisting of a forward member and a rear member hinged together and guided upon said bed, the construction permitting the turning of the forward track member, while maintaining its said hinged relation, and also the bed below a horizontal plane, and means connecting the movable element of the range finder with the said rear track member so that the two move in unison, said means including an angle plate secured to the rear track member and a stud upon said angle plate which engages and co-acts with the means connected with the movable element of the range finder.

34. A photographic camera structure including a box or casing having a bed hinged thereto to constitute a door when closed and having track guide rails, and a track supported and guided upon said bed and upon the inside of the bottom of said box or casing, said bed having a metal frame provided with a hinge and hinge pin, the camera box or casing having a companion hinge member, and screw-like securing means passing through holes in the bottom of the camera box and in the hinge member and into the said guide rails, thereby securing the parts together.

OSCAR STEINER.